United States Patent [19]

Nordhofen

[11] 4,074,573
[45] Feb. 21, 1978

[54] METHOD AND APPARATUS FOR THE MEASUREMENT OF VOLUMETRIC FLOWRATE IN PIPES AND DUCTS

[75] Inventor: Benedikt Nordhofen, Cologne, Germany

[73] Assignee: Bayer Aktiengesellschaft, Leverkusen, Germany

[21] Appl. No.: 717,074

[22] Filed: Aug. 24, 1976

[30] Foreign Application Priority Data

Sept. 10, 1975 Germany ............................. 2540223

[51] Int. Cl.² .............................................. G01F 1/36
[52] U.S. Cl. .................................... 73/205 R; 364/510
[58] Field of Search ................. 73/205 R, 205 D, 211, 73/213; 235/151.34

[56] References Cited

U.S. PATENT DOCUMENTS

| 3,376,745 | 4/1968 | Davis | 73/205 D |
| 3,388,597 | 6/1968 | Bargen et al. | 73/213 X |
| 3,407,658 | 10/1968 | Kerbow et al. | 73/205 D |

FOREIGN PATENT DOCUMENTS 1,089,860  11/1967  United Kingdom .............. 73/205 D Primary Examiner—Charles A. Ruehl
Attorney, Agent, or Firm—Burgess, Dinklage & Sprung

[57] ABSTRACT

The volumetric flowrate in ducts and pipes can be determined from only two pressure signals before and at a throttle point, it being immaterial to what extent the pipe or duct is filled or whether a backwash is present.

1 Claim, 1 Drawing Figure

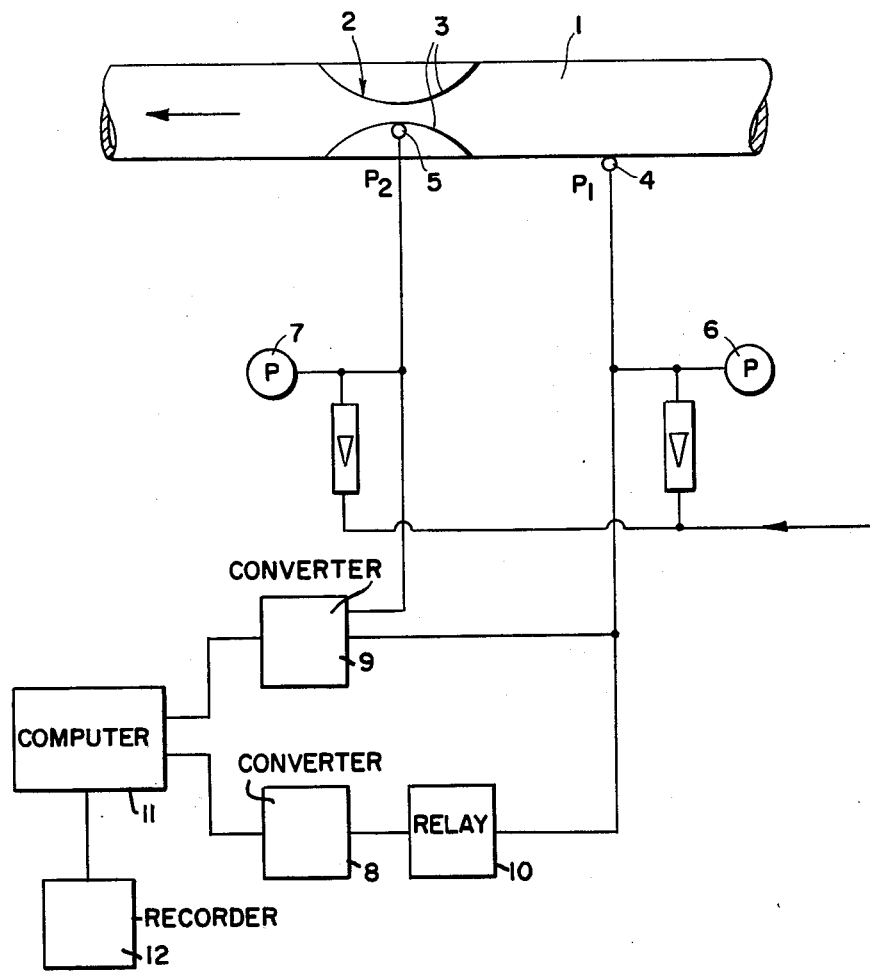

METHOD AND APPARATUS FOR THE MEASUREMENT OF VOLUMETRIC FLOWRATE IN PIPES AND DUCTS

The invention relates to a method and an apparatus for the measurement of volumetric flowrate in pipes and ducts.

Volumetric flowrate measurement according to this method is, for example, necessary to determine quantities of purified or unpurified waste water of companies and local authorities, which pipe waste water flows into rivers, lakes and seas, in which the outlet may be flooded to varying degrees by high water or tides, so that the out flow conditions are altered by the production of a backwash. Moreover, waste water quantities are in general subject to large fluctuations so that the level in the pipes may fall in the case of a low supply.

Formulas are known for specific operating conditions with which a measurement of volumetric flowrate is possible from pressure values at specific throttle devices. In the case of permanently flooded throttle devices, such as where the throttle is incorporated into a siphon or in the case of the incorporation of the throttle under the lowest possible down stream water level, the differential pressure method is used which means that the volumetric flowrate F is proportional to a power n of the differential pressure $\Delta p = p_1 - p_2$, and $n$ is approximately 0.5 In the case of partially filled throttle devices, the pressure $p_1$ is measured before the throttle point and, the volumetric flowrate F is proportional to a power m of this pressure. Generally m is greater than 1.5, assuming that the downstream water level has no effect on the upstream water levels, and thus no backwash is present. One proposed solution to determine volumetric flowrates taking into account a backwash (German Patent 1,260,808), requires an additional measurement device to determine the downstream water level and contains a function not described in more detail of the difference between the upstream water level and the downstream water level. For automatic measurement in this case a complicated switching mechanism is required to at least three evaluation processes adapted to the different operating conditions.

According to the invention, there is provided a method for the measurement of the volumetric flowrate in a pipe or duct in which a throttle device is arranged, wherein a pressure $p_1$ is measured upstream of the throttle device and pressure $p_2$ is measured at the throttle device, the pressure values are converted into electric signals representing $p_1$ and $p_1-p_2$ and the volumetric flowrate F is determined in a computer having said electric signals as an input by the formula:

$$F = A(p_1-p_2) + B(p_1-p_2)^n + C(p_1-p_2)^n \cdot p_1 + D$$

wherein A, B, C and D are constants determined empirically according to the shape and size of the pipe or duct but independent of the form of the throttle device, the exponent $n$ is chiefly 0.5, but may be fitted by means of a regression statement, and the value of the factor $p_1$ in the third term of the formula may not assume a value greater than the pressure which corresponds to the completely filled pipe.

There is also provided an apparatus for the measurement of the volumetric flowrate in a pipe or duct in which a throttle device is arranged, comprising two pressure measurement devices, the first arranged upstream of the throttle device and the second being arranged at the throttle device, whereby the first device measures a pressure $p_1$ and the second device measures a pressure $p_2$; two signal converters, the first producing a first electric signal representing $p_1$ and the second producing a second electric signal representing the pressure difference $p_1-p_2$; a computer having said first and second electric signals as an input, the computer being arranged to determine the volumetric flowrate F by the formula:

$$F = A(p_1-p_2) + B(p_1-p_2)^n + C(p_1-p_2)^n \cdot p_1 + D$$

wherein A, B, C and D are constants determined empirically according to the shape and size of the pipe or duct but independent of the form of the throttle device, the exponent $n$ is chiefly 0.5, but may be fitted by means of a regression statement, and the value of the factor $p_1$ in the third term of the formula may not assume a value greater than the pressure which corresponds to the completely filled pipe.

The particular advantage of the invention is that with only two spatially adjacent measurement value recorders and without a switching device the volumetric flowrate can be determined within a wide range both in the case of a partially filled pipe without backwash, with a partially filled pipe with backwash or also in the case of a pipe filled as a result of backwash in each case using the same formula. If the coefficients have been determined using models, then when being transferred the laws of similarity must be taken into account when sealing up.

The measurement of volumetric flowrate is not restricted to pipes of cylindrical cross-section; a measurement of volumetric flowrate can also be carried out according to the method specified on other pipe and duct cross-sections, such as rectangular, oval or elliptical shapes.

It is a particular advantage of the invention that the throttle points can assume varying forms. It must be admitted that the coefficients A, B, C, D and $n$ must be determined afresh for each throttle form, but it is advantageous that the throttle devices already available can be used and the method can be adapted to special operating conditions. Conventional throttle devices include Venturi tubes having rectangular, V-shaped, trapezoidal, V-shaped rounded profile or a profile composed of a combination of the profiles mentioned above. The area ratio of the throttle point, i.e. the ratio of the cross-section at the throttle points to the free pipe cross-section can be adapted to the measurement task. Another decisive factor in selection is whether the quantities of liquid fluctuate in time only moderately but a high measurement accuracy is required or whether the quantities of liquid may vary in order of magnitude and above all a large measurement range is desired.

It is possible instead of a Venturi tube to use as the throttle point a throttle nozzle or orifice.

An embodiment is illustrated in the single FIGURE comprising the drawing and is described in more detail in the following.

A Venturi tube 2 with vertically opposed cheeks 3 is incorporated in a cylindrical pipe 1, and the area ratio $m = 0.3$. The pressures $p_1$ and $p_2$ prevailing at 4 and 5 may, for example, be determined by the air bubble method and indicated in the manometers 6 and 7. In the converters 8 and 9, electrical signals proportional to the pressure $p_1$ and the pressure difference $\Delta p = p_1-p_2$ are derived from the pressures. A no-load selection relay 10 is arranged before the converter 8, so that the value $p_1$, in the event of its exceeding the value of the hydrostatic pressure $p_s$ of the completely filled measurement tube ($p_s = d \cdot \gamma$; $\gamma$ = specific weight of the liquid), is limited to this value. $p_1$ and $p_1 - p_2$ are combined in the computer 11 according to the specified relationship and the volumetric flowrate F is recorded on the recorder 12. The pipe diameter is 94mm. The coefficients A,B,C,D have the values—0.051, 0.12, 0.011 and 0.0069 respectively, and $n$ has the value 0.5. The pressure values are entered in water column mm and the volumetric flowrate is thus given in cubic meters per hour. The measurement error is between 0.4 m³/h and 3.1 m³/h being thus less than 5%.

This result can be transferred to pipes having a different diameter $d$. Then the coefficients A,B,C,D have the following values:

$A = -0.051 \lambda^{3/2}$
$B = 0.12 \lambda^2$
$C = 0.011 \lambda$
$D = 0.0069 \lambda^{5/2}$ in which $\lambda$ is the scale ratio.

What we claim is:

1. An apparatus for the measurement of the volumetric flowrate in a duct having a throttle device therein; said apparatus comprising: a first and a second pressure device for measuring pressure; means connecting said first pressure device upstream of the throttle device; means connecting said second pressure device at said throttle device; said first pressure device being operable to measure a pressure $p_1$ and said second pressure device being operable to measure a pressure $p_2$; a first signal converter connected to said pressure devices for producing a first electric signal representative of the pressure $p_1$; a second signal converter connected to said pressure devices for producing a second electric signal representative of the pressure difference $p_1 - p_2$, lead means for connecting said first and second converters to a computer to apply said first and second electric signals thereto, said computer being of the type for producing a signal F according to the relation $$F = A(p_1 - p_2) + B(p_1 - p_2)^n + C(p_1 - p_2)^n \cdot p_1 + D$$

wherein A, B, C and D are empirically determined constants that vary according to the shape and size of the duct, and $n$ is substantially 0.5 but may be determined by means of a regression statement; and limiting means between said first converter and the computer for limiting the value $p$ to a value not exceeding the pressure which corresponds to a completely filled duct.

* * * * *